(12) United States Patent
Hameister et al.

(10) Patent No.: US 7,229,063 B2
(45) Date of Patent: Jun. 12, 2007

(54) PRESSURE CONTROL VALVE

(75) Inventors: Thies Hameister, Friedrichshafen (DE); Walter Kill, Friedrichshafen (DE); Karlheinz Mayr, Bregenz (DE); Wolfgang Schmid, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 188 days.

(21) Appl. No.: 10/946,507

(22) Filed: Sep. 21, 2004

(65) Prior Publication Data

US 2005/0061374 A1 Mar. 24, 2005

(30) Foreign Application Priority Data

Sep. 23, 2003 (DE) ................................ 103 43 843

(51) Int. Cl.
*F16K 31/02* (2006.01)
(52) U.S. Cl. ...................... 251/129.15; 137/596.17; 137/596.1; 335/217
(58) Field of Classification Search ............ 137/596.1, 137/596.17; 251/129.15; 335/217
See application file for complete search history.

(56) References Cited

U.S. PATENT DOCUMENTS

| | | | | | |
|---|---|---|---|---|---|
| 2,096,763 | A | * | 10/1937 | Ray et al. .................... | 335/245 |
| 2,694,544 | A | * | 11/1954 | Hall ............................. | 251/35 |
| 3,608,585 | A | * | 9/1971 | Huntington ............ | 137/625.65 |
| 3,670,768 | A | * | 6/1972 | Griswold ................... | 137/606 |
| 3,944,958 | A | * | 3/1976 | Postma ....................... | 336/136 |
| 4,074,700 | A | * | 2/1978 | Engle ..................... | 137/625.27 |
| 4,341,241 | A | * | 7/1982 | Baker ........................ | 137/554 |
| 5,118,077 | A | * | 6/1992 | Miller et al. ............ | 251/129.15 |
| 5,264,813 | A | * | 11/1993 | Byers, Jr. .................... | 335/217 |
| 5,513,832 | A | * | 5/1996 | Becker et al. ......... | 251/129.18 |
| 6,390,444 | B1 | | 5/2002 | Moreno et al. | |
| 6,619,615 | B1 | | 9/2003 | Mayr et al. | |
| 6,666,231 | B2 | | 12/2003 | Entwistle | |
| 6,720,853 | B1 | * | 4/2004 | Callis et al. ................ | 335/258 |
| 6,989,729 | B2 | * | 1/2006 | Mayr et al. ................. | 335/220 |
| 2003/0037825 | A1 | | 2/2003 | Runge et al. | |
| 2004/0130421 | A1 | | 7/2004 | Mayr et al. | |

FOREIGN PATENT DOCUMENTS

| | | |
|---|---|---|
| DE | 196 06 381 A1 | 9/1996 |
| DE | 199 04 901 A1 | 8/2000 |
| DE | 101 01 247 A1 | 7/2001 |
| DE | 100 34 959 A1 | 2/2002 |
| DE | 100 64 349 C1 | 5/2002 |
| DE | 102 48 181 A1 | 4/2004 |
| DE | 102 55 414 A1 | 9/2004 |

\* cited by examiner

*Primary Examiner*—Eric Keasel
*Assistant Examiner*—Craig Price
(74) *Attorney, Agent, or Firm*—Davis Bujold & Daniels, P.L.L.C.

(57) ABSTRACT

The invention concerns a pressure control valve for the control of the value of pressure in a hydraulic circuit, especially in a hydraulic circuit of a vehicle transmission, with a valve housing, with a solenoid coil, with an armature component group comprising an armature rod, an armature and advantageously, a spring, with a yoke and with a push rod, which is interposed between the armature rod and a control element, whereby the section of the valve housing (3) in the zone of the control element (16) consists of a plastic flange (2*a*), and further, the armature rod (1) possesses a control boring in the longitudinal direction, in which a pin (12, 12', 12") is inserted, the material and dimensioning are so selected, that the pin can compensate for a temperature based longitudinal change of the plastic flange (2*a*).

15 Claims, 2 Drawing Sheets

PRESSURE CONTROL VALVE

This application claims priority from German Application Serial No. 103 43 843.2 filed Sep. 23, 2003.

FIELD OF THE INVENTION

The present invention concerns a pressure control valve for the regulation of pressure in a hydraulic circuit, especially in a hydraulic circuit for a vehicle transmission.

BACKGROUND OF THE INVENTION

Many types of pressure control valves are already known within the state of the technology. Many of these said valves were used as servo valves in the regulation of clutches in automatic motor vehicle transmissions. In such transmissions, the hydraulic pressure is found to be about 10 bar or greater. This initial pump pressure is normally reduced by a pressure reducing valve to a service pressure of about 5 bar, to which is subjected a pressure control valve. The pressure control valve of concern, for example, is designed as a proportional control valve. After a clutch has been engaged, in order to hold said clutch in that selected stage, normally a safety-factor excess pressure, which generally represents the system pressure, is applied to the clutch cylinder and by means of additional, pressure retaining valves, the said pressure is maintained. With this arrangement, three valves, namely a proportional pressure control valve, a pressure reducing valve, and a pressure-retaining valve, are required for the operation of a clutch in an automatic transmission.

Other pressure control valves have been proposed, which fulfill all of the above functions, and thereby offer simplified construction. A proportional pressure regulating valve, which serves as a pilot valve is provided with a pressure reducing and a pressure-holding function, is described in DE-A 199 04 901. In the case of this known pressure control valve, a proportional solenoid is provided, which, in its scope of operation, approaches a constant strength of magnetism. This proposed pressure control valve possesses a valve housing, a control element for opening and closing a throttle port and has an armature rod for the connection of the control element, the rod being actuated by a proportioning solenoid. The valve further has a solenoid core, a solenoid armature and a solenoid coil, to the end that the solenoid armature rod is axially displaceable, moving back and forth between two defined end positions.

For the control of the pressure in hydraulic circuits, with assist from pressure control valves of the described kind, the basis is, that by means of the proportional solenoid, the coil current is regulated to be proportional to the size of the output force. That is, the solenoid armature and thereby a valve throttling element related to said armature, controls the demands of a clutch, in accord with the coil current. Thus, a desired pressure-current-characteristic curve for an electro-hydraulic control of automatic transmission is thus produced from the solenoid-current-characterization curve of the pressure control valve.

DE-A 100 34 959 of the applicant, discloses a proportional pressure control valve having a valve component with in and out ports and with at least one means for the proportional control of an aperture, as well as having a solenoid component, which possesses a solenoid core, a solenoid coil and a slidingly displaceable solenoid armature. To accomplish the desired purpose thereof, an activation element acts in concert with the solenoid armature, which activation element initiates a spherical shutoff means. In accord therewith, the hydraulically responsive cross-section of the aperture is essentially determined by the length of the aperture assembly, the diameter thereof, and the diameter of that part of the activation element which impinges therein.

Proposed in a non-published application of the applicant under file number DE 102 55 414.5 is a proportional pressure control valve for the regulation of pressure in a hydraulic circuit, especially in a hydraulic circuit for a vehicle transmission, wherein the pressure-current characteristic curve exhibits, at least partially, a very flatly rising curve at low current, and conversely at greater current, a very sharp pressure-current slope. This pressure control valve possesses a push rod as a connection between a control element in the hydraulic circuit and a proportional magnet in the housing, which has a solenoid core, a solenoid armature, and a coil. Further in this case, the solenoid coil and the solenoid core are securely bound to the housing. In the interior space of the solenoid coil, the armature, is axially moveable back and forth between end positions by a magnetic force existing between within the air space between the solenoid armature and the solenoid core (solenoid core=the magnetic control edges) for the purpose of activating the control element. At least a part of the solenoid armature is moveably placed in relation armature rod, as determined by the magnetic flux, so that, in this manner, either the air space is enlarged by said movability, and/or an additional, second air space is created.

Since the hydraulic pump of a transmission, usually produces strong pulsations, which are transferred to all moveable parts in the said transmission, it is possible that vibrations can be imparted to the armature of electromagnetic pressure control valves, which vibration in turn, can be transmitted to the clutches. For this reason, very frequently, electromagnetic pressure control valves are provided with damping chambers, which soften the axial movements of the armature. The armature is enclosed by a magnetic coil and a magnetic core for the purpose of bringing about the mentioned axial movements. In order, that such pulsation related vibrations can be avoided, in DE-A 196 06 381, a pressure regulator for electro-hydraulic transmission control was proposed, which was designed as a valve seat operated control with a solenoid coil and a core, which encased an armature, which is axially, slidably displaceable by the magnetic force in its given space. The armature is carried both in a forward and a rearward set of bearings. Further, the pressure regulator possesses a push rod, which on its one end connects with an end face of the armature rod in the area of its forward bearing, or it is loosely carried thereon adjacent to the armature and on its other end, is secured in a gate assembly for an oil through-flow boring and is aligned therein by a push rod guide. The armature space is divided by the armature into two damping chambers. Between an adjustment apparatus and the rear bearing of the armature, is formed a oil filled damping chamber on the end remote from the push rod. The closure housing possesses a greater diameter than does the push rod and between the forward bearing of the armature and the push rod, is a damping chamber filled with oil, which is connected with the armature space by means of a relief boring.

In another unpublished application of the applicant, under the file number of DE 102 48 181.4, an electrical pressure controller valve has been proposed, which, reacts quickly to current changes and if disturbed by an overload, handles the said disturbance without changing any preset operational values. In order to support damping, not only by means of the outside diameter of the armature and its bearings, in this proposed pressure control valve, an armature rod is centrally bored by a axial, longitudinal opening, into which a pin is inserted with preselected clearance. Thereby, the active length of the surface, frictionally reacting to oil viscosity, can be differently shaped, and be expanded several times. The said inserted pin is fastened onto the throttling passage assembly, which is present in the case all known pressure control valves, and is actually in the form of threaded adjustment body. By means of a simple extension of this adjustment body, a counter surface in the boring can be created.

By means of the insertion of this pin, the dimensions of which are complementary to dimensions of the said longitudinal boring, the said pin fits into the longitudinal boring with little play, whereby additional damping is created because of oil viscosity, which damping can be increased by additional, transverse borings in the pin, which lead to a discontinuous event in the characteristic curve.

Besides these disturbing influences caused by pulsation, temperature swings also act disadvantageously against operation of the electrohydraulic pressure controller. This is because this pressure controller exhibits strong regulatory drifts during temperature changes. That is to say, the operating pressure for the control of the valve gate, which, with constant flow, regulates in a defined manner, will change in accord with temperature variation.

In order to exclude this disadvantageous influence, efforts have been made, to use expensive and costly materials, notably plastics, for the moveable valve flow positioning members, in order to bring the damaging temperature drift into a manageable range. However, the difficulty lies not in the expense of the material, but rather in the cost of fabricating the material. Further trials to solve the problem were made by complex software controls, which depend on the installation of a temperature sensor. Such software controls endeavor to hold to a minimum the pressure differences at the valve gate, caused by the pressure controller by means of corresponding feedback control. This goal can only be achieved to a limited extent.

The purpose of the invention is to create a simple, reliable and economical apparatus, in order to substantially reduce the temperature drift of the presently used electro-hydraulic pressure control valves.

SUMMARY OF THE INVENTION

The invention is based on a pressure control valve for the regulation of pressure in a hydraulic circuit, especially in a hydraulic circuit of a vehicle transmission, said valve having a valve body, a solenoid coil, an armature component group comprised of an armature rod, an armature and preferably a spring with a yoke and a push rod, which latter is interposed between the said armature rod and a control element, whereby that section of the valve housing in the area of the control element is a fabricated plastic flange. In accord with the invention, provision has been made that the armature rod advantageously has a central boring in its axial and longitudinal direction, into which a pin is inserted. The outside dimensions of the said pin and its material are so selected, that the pin compensates for any axially directed temperature expansion of the plastic flange.

Advantageously, on the end of the said pin, which end is proximal to an adjustment body, is provided a contacting disk, which rests upon a complementary disk of the armature rod and is loaded by a compression spring.

On that end of the said pin adjacent to the push rod, advantageously is provided a connector for guidance of the pin within the armature rod.

In another advantageous embodiment example, the pin can be of injection molded material within the armature rod.

BRIEF DESCRIPTION OF THE DRAWINGS

The invention will now be described, by way of example, with reference to the accompanying drawings in which.

DETAILED DESCRIPTION OF THE INVENTION

Since pressure controllers of this kind are well known to the expert, in the following, only the essential components thereof are described, as needed for an understanding of the invention.

Figure 1:
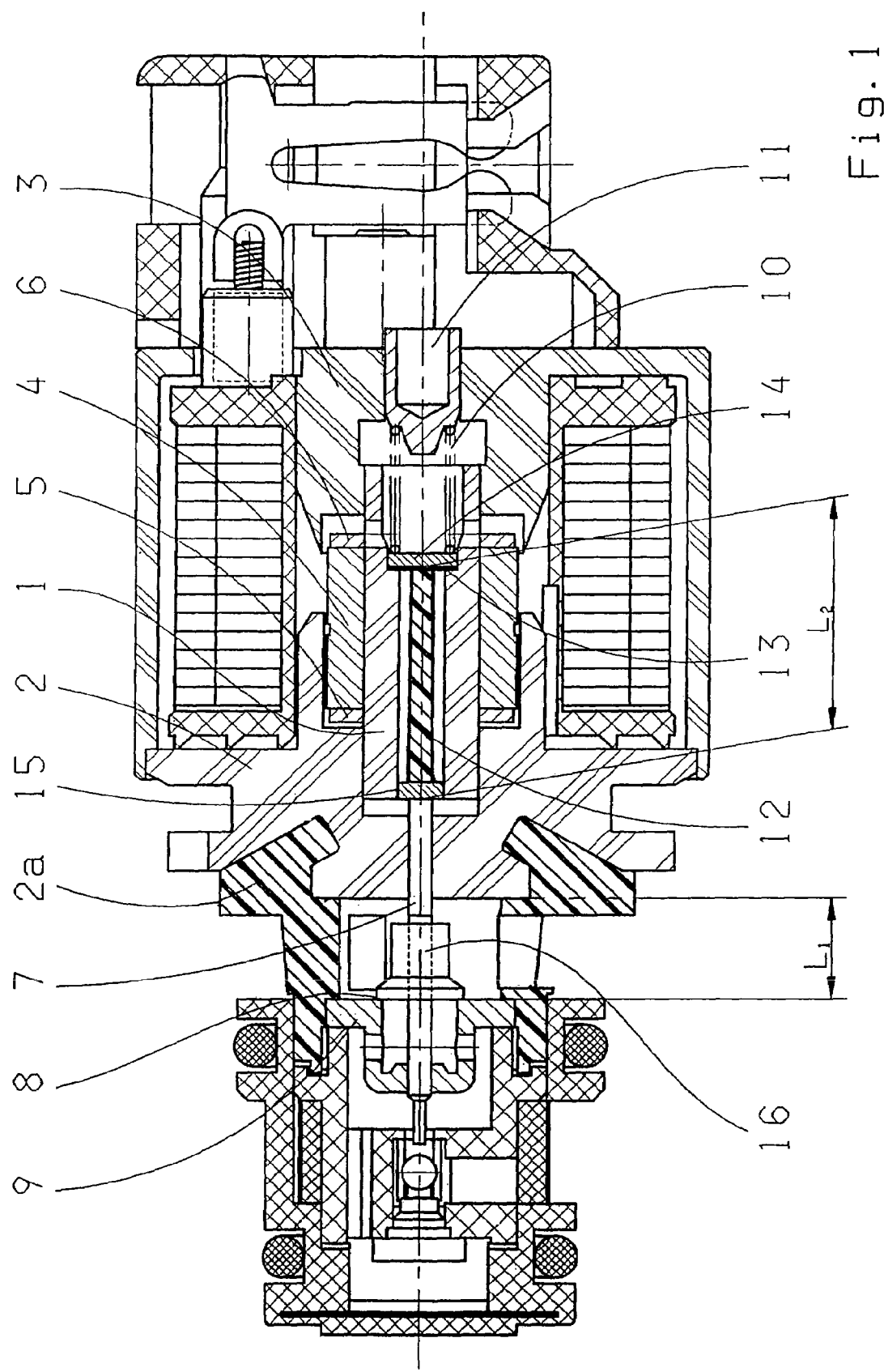
FIG. 1 a longitudinal section through a pressure control valve made in accord with the invention.

The pressure control valve shown in FIG. 1 possesses in the normal manner, a housing 3, and a yoke 2, within which an armature component group is set, consisting of an armature rod 1, the armature 4 as well as anti-stick disks 5 and 6, and is held in place by means of the force of a magnet and that of a spring 10, the force of which changes but little as a result of temperature, as well as by the hydraulic counter force at the valve seat 8 of the control element 16. In the zone of the control element 16, the said yoke 2 is surmounted by a flange 2a, this being plastic, which easily conforms to complicated shaping and is more economical in fabrication costs. The operating temperature range of this pressure controller is now substantially influenced by a temperature increase or decrease of dimension $L_1$, i. e., the separating distance between the seat-plate 9 from yoke 2. This is caused by changes in axial length of the plastic flange 2a, which changes are not in proportion, when compared to alterations of push rod 7 and valve seat 8, which is pressed onto the end of push rod 7. Upon a variation in temperature, due the large coefficient of expansion of the plastic, a change occurs in the separating distance between the seat plate 9 to the yoke 2, whereby, for the purpose of holding the given pressure constant, the pressure controller must respond by causing a regulated positional change of the armature component group in the solenoid field. Thereby, the magnetic force changes itself relative to the push rod 7, although the flow remains constant. This leads, with a constant flow, in a disadvantageous manner to a vacillating operating pressure.

In accord with the invention, provision is now made, that the armature rod 1, advantageously possesses a central, longitudinal boring, into which a pin 12 can be inserted, the material and the outside dimensions of which are so selected, that the inherent temperature expansions and reductions thereof, compensate for the described thermal expansions/reductions of the plastic flange 2a.

In the case of the embodiment example shown in FIG. 1, the pin 12 is provided with a contact disk 14 which can come to rest on the contact disk 13 the armature rod 1 and is held thereon by the force of a compression spring 10. The forward situated end of the pin 12, which contacts the push rod 7, is provided with a connection 15, which serves for the alignment of the pin 12 within the armature rod 1. A constructive embodiment of the pin 12 can possibly be done without the said aligning connection 15.

In the case of a change in temperature, the pin 12 alters its length $L_2$ in an ideal manner, that is the expansion of $L_2$ undergoes the same measurement as that of the plastic flange 2a and thereby the distance of the valve seat plate 9 from the yoke 2 remains constant.

Figure 2:
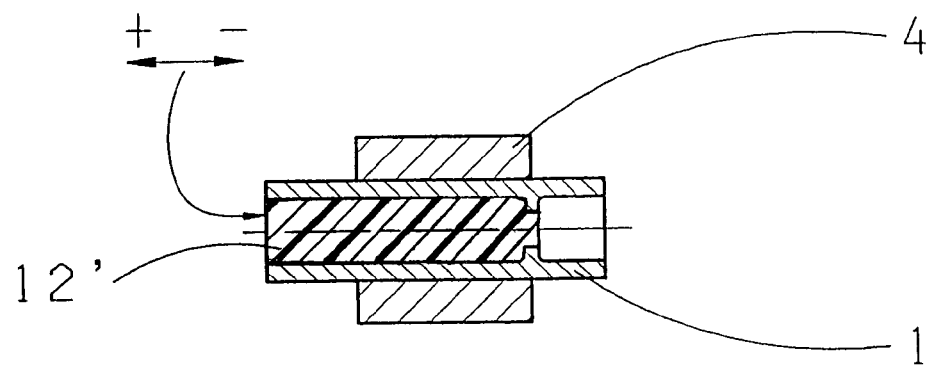
FIG. 2 a partial section through the armature and the armature rod of another embodiment.

In the embodiment shown in FIG. 2, the pin 12' is not inserted into the armature rod 1, but is molded in by injection, so that a shape fit connection with the interior of the armature rod 1 is achieved. Furthermore, in this way, as is noted by the plus and minus double arrow, a temperature caused change in length of the plastic flange 2a can be compensated for by appropriate choice of material and dimensioning of the revised pin 12'.

Figure 3:
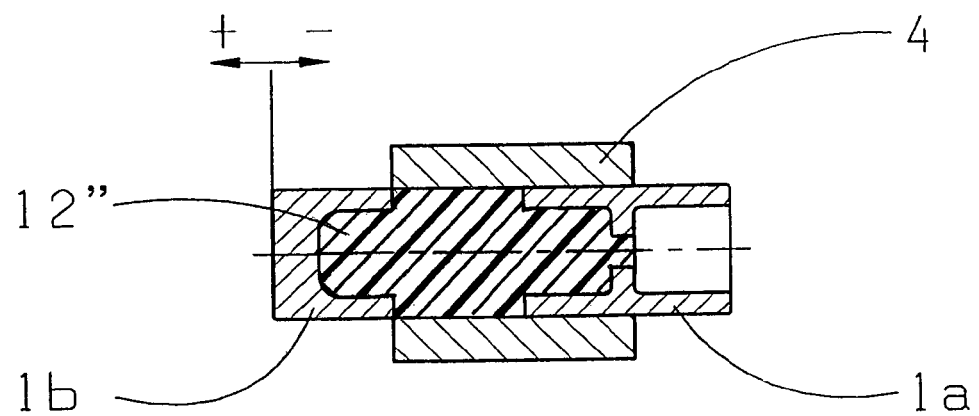
FIG. 3 a partial section through the armature and the armature rod of yet another embodiment.

In the embodiment shown in FIG. 3, in accord with the invention, the armature rod is in two pieces, which are defined as part 1a and part 1b. In the midportion of each armature rod portion is a central longitudinal boring, which, as above, is filled with a molded pin 12", wherein also, this pin now binds the two said pieces 1a and 1b together. Even in this case, the said pin 12" is made of temperature-reactive material and so dimensioned, as to compensate the longitudinal expansion of the plastic flange 2a.

In all cases, where the pin 12, 12' and 12" is concerned, the material advantageously adapted would be a plastic. Besides this, consideration can be given to measurement and composition of brass or aluminum, wherein the temperature expansion coefficient would be decisive.

REFERENCE NUMERALS

1 Armature rod
1a Armature rod section
1b Armature rod section
2 Yoke
2a Flange, made of plastic
3 Body (valve housing)
4 Armature
5 Anti-stick disk
6 Anti-stick disk
7 Push rod
8 Valve seat
9 Plate, for valve seat
10 Compression spring
11 Adjustment body
12 Pin
12' Pin
12" Pin
13 Contact disk
14 Contact disk
15 Connector
16 Closure housing, also "Control Element"
$L_1$ Distance of seat plate 9 from yoke 2
$L_2$ Length of pin

The invention claimed is:

1. A pressure control valve for regulating pressure in a hydraulic circuit of a vehicle transmission, the pressure control valve comprising;
a valve housing containing a solenoid coil, an armature rod, an armature, and a spring, the control valve further comprising a yoke and a push rod which are located between the armature rod and a control element, the spring biasing the control element, via a pin and the push rod, against a valve seat of the seat plate, and an end of the pin (12), remote from the push rod, has a contact disk (14) which abuts against a complementary contact disk (13) of the armature rod to prevent further movement of the pin (12) toward the valve seat;
the push rod (7) and the pin (12) being axially aligned with one another, the armature rod (1) having a longitudinally through bore in which the pin (12) is accommodated, the pin (12) having a fixed length and being made of a material, wherein inherent temperature expansions and reductions of the pin, compensate for thermal expansions/reductions of the plastic flange, and whereby the distance of the valve seat plate from the yoke remains constant.

2. The pressure control valve according to claim 1, wherein the contact disk (14) of the pin (12) is located proximal to an adjustment body (11).

3. The pressure control valve according to claim 1, wherein an end of the pin (12), proximal to the push rod (7), has a connector (15) which facilitates axial alignment of the pin within through bore of the armature rod (1).

4. The pressure control valve according to claim 1, wherein the pin (12) is accommodated within the armature rod (1) with play to facilitate movement of the pin (12).

5. The pressure control valve according to claim 1, wherein the pin (12') is inserted with a shape-fit connection in the through bore of the armature rod (1).

6. The pressure control valve according to claim 1, wherein the armature rod (1) comprises first and second individual armature rod sections (1a, 1b)which are connected together by a pin (12"), the first individual armature rod section is located adjacent to a first end of the pin and the second individual armature rod section is located adjacent a second end of the pin, the first and the second individual armature rod sections and the pin having approximately the same dimension allowing the first and the second individual armature rod sections and the pin to axially slide within the through bore of the armature.

7. The pressure control valve according to claim 1, wherein the pin (12, 12', 12")is made of plastic.

8. A pressure control valve for regulating pressure in a hydraulic circuit of a vehicle transmission, the pressure control valve comprising;
a valve housing containing a solenoid coil and an armature component group, the armature component group comprising an armature rod, an armature, and a spring, the valve further having a yoke and a push rod which are located between the armature rod and a control element, the spring biasing the control element, via a pin and the push rod, against a valve seat of the seat plate, and an end of the pin (12) proximal to an adjustment body (11) has a contact disk (14) which abuts against a complementary contact disk (13) of the armature rod to prevent further movement of the pin (12) toward the valve seat;
a section of the valve housing in a zone of the control element is made of a plastic material, the armature rod (1) having a central, longitudinally directed through bore into which the pin (12) is inserted, the pin has a dimension of fixed length and is made of a plastic material, wherein inherent temperature expansions and reductions of the pin, compensate for thermal expansions/reductions of the plastic flange, and whereby the distance of the valve seat plate from the yoke remains constant.

9. A pressure control valve for regulation of a value of pressure in a hydraulic circuit, of a vehicle transmission, the control valve comprising: a valve housing, a solenoid coil, an armature component group, comprising an armature rod, an armature, and a spring, said control valve further having a yoke and a push rod, interposed between the armature rod and a control element, a plastic flange couples the yoke with a seat plate, the armature rod (1) having a central through bore, longitudinally directed boring into which a pin (12) is inserted, the spring, via the pin and the push rod, biasing the control element against a valve seat of the seat plate, a length of the pin and a material used to manufacture the pin are selected such that, due to a variation in temperature, wherein inherent temperature expansions and reductions of the pin (12), compensate for thermal expansions/reductions of the plastic flange, and whereby the distance of the valve seat plate from the yoke remains constant.

10. The pressure control valve according to claim 9, wherein the pin (12) on an end proximal to an adjustment body (11) is provided with a contact disk (14) which abut against a complementary contact disk (13) of the armature rod.

11. The pressure control valve according to claim 9, wherein the pin (12) on an end proximal to the push rod (7) is provided with a connector (15) which serves for axial alignment of the pin within the through bore of the armature rod (1).

12. The pressure control valve according to claim 9, wherein the pin (12) is accommodated within the armature rod (1) with play to facilitate movement of the pin (12).

13. The pressure control valve according to claim 9, wherein the pin (12') is inserted with shape-fit connection in the through bore of the armature rod (1).

14. The pressure control valve according to claim 9, wherein the armature rod (1) is separated into two individual armature rod sections (1*a*,1*b*) which are bound to one another by a-shape-fit the pin (12"), a first individual armature rod section is located adjacent to a first end of the pin and the second individual armature rod section is located adjacent a second end of the pin, the two individual armature rod sections and the pin having approximately the same radius allowing the two individual armature rod sections and the pin to axially slide within the through bore of the armature.

15. The pressure control valve according to claim 9, wherein the pin (12, 12', 12") is made of plastic.

* * * * *